Patented Jan. 26, 1937

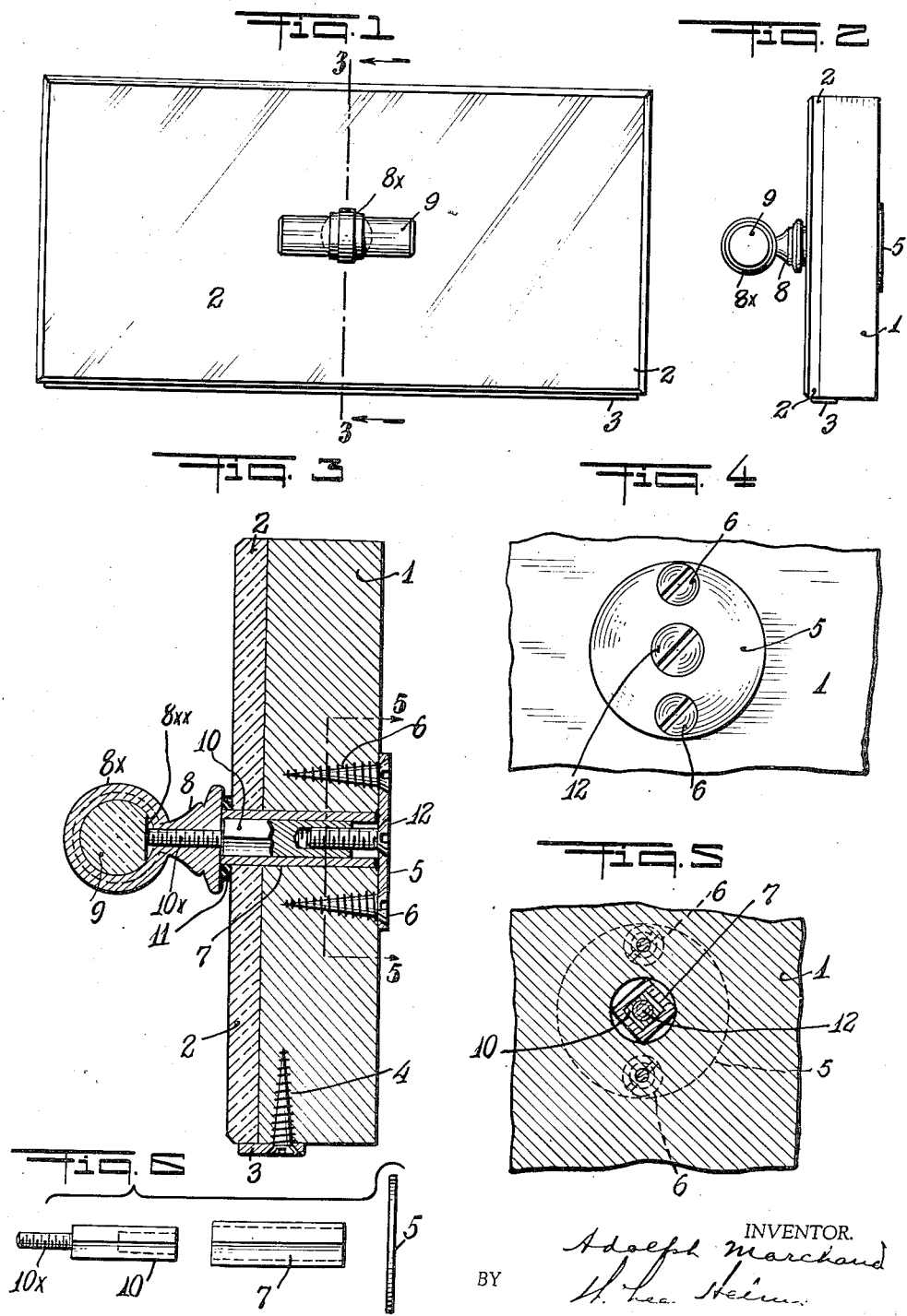

2,068,922

UNITED STATES PATENT OFFICE 2,068,922

HANDLE CONSTRUCTION

Adolph Marchand, Jackson Heights, N. Y.

Application October 7, 1936, Serial No. 104,398

4 Claims. (Cl. 16—110)

The object of the present invention is to provide a handle construction particularly adapted for use in conjunction with mirror front drawers, doors, and the like, in which the handle is used as one, and sometimes the primary, holding element for the mirror. For such reason a member of the handle construction is passed through the mirror into and generally through the drawer or door framework in order that a rear area of the handle may bear upon the outer face of the mirror.

In the constructions of this general type now in use, the handle is moved against the mirror, as by screws, until the operator determines that it is firmly held by the framework, and frequently in such securing operation of the handle to the framework the mirror is broken by external pressure thereon imposed by handle elements. Thus, such prior constructions depend upon the judgment of the operator who applies the handle to the framework forwardly of the glass of the mirror, as to what pressure can be put upon the glass consistent with securing a firm and rigid mounting of the handle to the framework.

In my invention, an exactly predetermined pressure is placed upon the mirror, and no additional pressure, notwithstanding the application of a maximum gripping bond between the handle elements and the drawer or door member. The mirror is held with just that predetermined pressure sufficient to maintain it in the required abutment with the drawer, door, or the like, without any possibility of breakage.

Also, in former constructions in removing the handle, it is generally necessary to remove all of the attaching parts from the drawer front or door, whereas, in my construction the removal of a single screw enables withdrawal and removal of the mirror or glass.

The invention will be described with reference to the accompanying drawing, in which:—

Figure 1 is a view in elevation of a drawer front with the invention applied thereto.

Figure 2 is a side elevation of the same.

Figure 3 is an enlarged sectional elevation on the line 3—3, Figure 1.

Figure 4 is a fragmentary rear elevation of the construction shown in Figure 3.

Figure 5 is a vertical section on the line 5—5, Figure 3.

Figure 6 is a detailed view in side elevation of the holding plate, sleeve, and internally threaded plug, forming elements of the invention.

Referring to the drawing, I have shown at 1 a drawer front which in the present instance is of wood construction and forming a backing support for a mirror 2. It will be understood that the form of the backing for the mirror shown in the drawing is illustrative merely, and that the member 1 may be a door frame, box cover, drawer front, or other member in conjunction with which the invention is applicable.

In the embodiment shown, the mirror 2 rests upon a metal plate 3 secured to the underface of member 1 by screws 4. The function of member 3 is to support the weight of the mirror 2.

On the rear face of member 1 is permanently secured a metal plate 5 which may be of disk formation, screws 6 being used to hold the plate rigidly in position. Both members 1 and 2 are formed with an aperture to receive the sleeve 7 and in usual practice this sleeve may be connected to plate 5 by soldering or welding, as desired. It will be noted that the sleeve projects forwardly beyond the front face of the mirror 2 and serves as an abutment for the handle member 8.

In the present embodiment, handle member 8 is formed with a ring $8x$ of ornamental design and which receives the glass pull rod 9. Secured to handle member 8 is an internally threaded plug 10 adapted to be received within sleeve 7. In the present embodiment, plug 10 carries a threaded pin $10x$ received within a threaded axially disposed aperture in handle member 8 and projecting into a channel formed at $8xx$ in rod 9 so as to hold the same against endwise or rotational movement.

In assembling the parts, plate 5 preferably secured to sleeve 7, will be placed in position, the sleeve entering the apertures of the members 1 and 2 and projecting forwardly of the latter member. Thereupon the plate may be permanently secured in position by the screws 6 and washer 11 may be placed over upon the projecting end of sleeve 7. If the washer is of substantially non-compressible material it may be of thickness exactly sufficient to occupy the space between the mirror and the projecting end of the sleeve. However, the washer may be made of rubber or other compressible material and in that case may be made of slightly greater thickness than the said area. The final steps are to place the plug 10 within the sleeve and secure it in position by means of screw 12 applied to plate 5. The screw may be rotated until the plug is thrown rearwardly to maximum position so as to rigidly hold the handle member in final position. When the washer 11 is of compressible material its pressure upon the mirror in such operation will be exactly the same in all cases, to wit, a pressure predetermined as sufficient to firmly hold the mirror in position and insufficient to cause its breakage.

In the above description, it will be understood that the word "mirror" is broadly used and that within the term is to be considered plate glass without a mirrored surface or any other fragile facing member which would be affected by compression or strains in applying a handle member to a drawer front, door, or the like, employing the facing.

Having described my invention, what I claim and desire to secure by Letters Patent, is as follows:—

1. A handle construction in combination with a glass-faced body, comprising a plate secured to the body rearwardly thereof, a shank member secured to the plate and projected forwardly through said body and glass face and beyond the front surface of the glass face, a handle secured to the shank member, and an apertured filling member surrounding the shank member in abutment with the glass face and the handle.

2. A handle construction comprising a plate adapted to be secured to the rear face of a body receiving the handle, a sleeve in abutment with the plate, a handle in abutment with the sleeve, an internally threaded plug carried by the handle and a screw carried by the plate and threaded in said plug.

3. A handle construction comprising a plate adapted to be secured to the rear face of a body for receiving said handle construction, a sleeve abutting said plate, an internally threaded plug received within the sleeve, a screw carried by the plate and threaded in said plug, a handle carried by the plug and a washer surrounding the sleeve and abutting the handle.

4. A handle construction in combination with a glass-faced drawer front in which the glass face rests upon a metallic shelf carried at the base of the drawer front, comprising a sleeve passing through an aperture formed in the said glass and drawer front, a plate abutting the sleeve at the rear face of the drawer front and secured to the latter, thereby maintaining the sleeve projected forwardly of the glass face, an internally threaded plug projected within the sleeve, a handle member carried by the plug, a screw carried by the plate and holding the handle member in abutment with the sleeve, and a washer surrounding the sleeve and abutting the handle member and glass face.

ADOLPH MARCHAND.